(12) United States Patent
Yamada et al.

(10) Patent No.: US 8,290,893 B2
(45) Date of Patent: Oct. 16, 2012

(54) FAILURE DIAGNOSIS SYSTEM, A FAILURE DIAGNOSIS DEVICE, AN INFORMATION UPDATE DEVICE, AND A COMPUTER-READABLE MEDIUM

(75) Inventors: Norikazu Yamada, Kanagawa (JP); Koji Adachi, Kanagawa (JP); Kaoru Yasukawa, Kanagawa (JP); Shigehiro Furukawa, Kanagawa (JP); Koki Uwatoko, Kanagawa (JP); Tetuichi Satonaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 534 days.

(21) Appl. No.: 12/549,112

(22) Filed: Aug. 27, 2009

(65) Prior Publication Data

US 2010/0161546 A1    Jun. 24, 2010

(30) Foreign Application Priority Data

Dec. 24, 2008    (JP) ................................. 2008-327565

(51) Int. Cl.
*G06N 5/02* (2006.01)
(52) U.S. Cl. .......................................... 706/54; 702/183
(58) Field of Classification Search .................... 706/54; 714/26, 48; 702/183
See application file for complete search history.

(56) References Cited

U.S. PATENT DOCUMENTS

2005/0240376 A1* 10/2005 Uwatoko et al. .............. 702/183

FOREIGN PATENT DOCUMENTS

| JP | A-06-044075 | 2/1994 |
|---|---|---|
| JP | A-06-095881 | 4/1994 |
| JP | A-07-084995 | 3/1995 |
| JP | A-2003-032253 | 1/2003 |
| JP | A-2007-286924 | 11/2007 |
| JP | A-2007-328846 | 12/2007 |

OTHER PUBLICATIONS

Horita et al., "Web Search Filtering Algorithm by Considering Personalization," The Special Interest Group Notes of Information Processing Society of Japan, *Information Processing Society of Japan*, vol. 2006, No. 135, pp. 89-92, Dec. 22, 2006 (With English-language Abstract).
Japanese Office Action issued in Application No. 2008-327565; Dated Jan. 4, 2011 (With Translation).

* cited by examiner

*Primary Examiner* — Jeffrey A Gaffin
*Assistant Examiner* — Ola Olude Afolabi
(74) *Attorney, Agent, or Firm* — Oliff & Berridge, PLC

(57) ABSTRACT

According to an aspect of the present invention, there is provided a failure diagnosis system including: a causal relationship information storage unit configured to store causal relationship information representing a causal relationship between events regarding a diagnosis-target apparatus, the causal relationship information including: common causal relationship information that is commonly used in a plurality of types of failure diagnosis regarding the diagnosis-target apparatus; and specific causal relationship information that is used in each specific type of failure diagnosis among the plurality of types of failure diagnosis; and a diagnosis execution unit configured to selectively execute the plural types of failure diagnosis by using a combined causal relationship information that is a combination of the common causal relationship information and a piece of the specific causal relationship information corresponding to a diagnosis-target type of failure diagnosis.

6 Claims, 14 Drawing Sheets

| EVENT TYPE | TAG |
|---|---|
| SOFTWARE ERROR | <SW. E. 123-456> |
| HARDWARE ERROR | <HW. E. 234-567> |
| FIRMWARE UPDATE | <UPD. V1.225> |
| PARTS REPLACEMENT | <PEX. No56789> |
| DIAGNOSIS REQUEST WITH NO MODEL UPDATE | <NA> |

FIG. 15

| TAG | UPDATE MODEL | ACTION |
|---|---|---|
| <SW. E. xxx> | SW ERROR MODEL | ADD PARTIAL DIAGNOSIS MODEL. WHEN DUPLICATED, UPDATE WITH LATEST DATA. |
| <HW. E. xxx> | HW ERROR MODEL | ADD PARTIAL DIAGNOSIS MODEL. WHEN DUPLICATED, UPDATE WITH LATEST DATA. |
| <UPD. Vxxx> | MAIN DIAGNOSIS MODEL | OVERWRITE MAIN DIAGNOSIS MODEL, AND DELETE DUPLICATED DATA FROM TEMPORARY DIAGNOSIS MODEL. |
| <PEX. Noxxx> | PARTS MODEL/MAIN DIAGNOSIS MODEL | ADD PARTIAL DIAGNOSIS MODEL TO PARTS MODEL. WHEN RELEVANT NODE EXISTS IN MAIN DIAGNOSIS MODEL, UPDATE PROBABILITY OF MAIN DIAGNOSIS MODEL. |
| <NA> | NONE | NONE |

| NODE Nx | NODE Ny | OK | Fail |
|---------|---------|------|------|
| 0 | 0 | ... | ... |
| 0 | 1 | 0.95 | 0.05 |
| 1 | 0 | ... | ... |
| 1 | 1 | ... | ... |

| NODE Nx | NODE Ny | OK | Fail |
|---------|---------|------|------|
| 0 | 0 | ... | ... |
| 0 | 1 | 0.98 | 0.02 |
| 1 | 0 | ... | ... |
| 1 | 1 | ... | ... |

| | FAILURE POINT | | | | |
|---|---|---|---|---|---|
| ERROR CODE | A | B | C | D | ... |
| 000-001 | O | | | | |
| 012-111 | | O | | O | |
| 116-324 | O | | O | | |
| ... | | | | | |

FIG. 18

| BUG No. | ERROR CODE | FIRMWARE VERSION | SW COMPONENT | | | | PARTS | | | |
|---|---|---|---|---|---|---|---|---|---|---|
| | | | S1 | S2 | S3 | ... | A | B | C | ... |
| 1 | 123-001 | 1.01 | | O | | | O | | | |
| 2 | 234-010 | 1.03 | O | | O | | | O | | |
| 3 | 345-100 | 1.10 | | | O | | | O | O | |
| ... | | | | | | | | | | |

FAILURE DIAGNOSIS SYSTEM, A FAILURE DIAGNOSIS DEVICE, AN INFORMATION UPDATE DEVICE, AND A COMPUTER-READABLE MEDIUM

CROSS-REFERENCES TO RELATED APPLICATIONS

This application is based on and claims priority under 35 USC 119 from Japanese Patent Application No. 2008-327565 filed Dec. 24, 2008.

BACKGROUND

1. Technical Field

An aspect of the present invention relates to a failure diagnosis system, a failure diagnosis device, an information update device, and a computer-readable medium.

2. Related Art

A system for failure diagnosis of an apparatus, such as copy machines, printers, vehicles, airplanes, robots, semiconductor designing devices, and the like is known.

SUMMARY

According to an aspect of the present invention, there is provided a failure diagnosis system including: a causal relationship information storage unit configured to store causal relationship information representing a causal relationship between events regarding a diagnosis-target apparatus, the causal relationship information including: common causal relationship information that is commonly used in a plurality of types of failure diagnosis regarding the diagnosis-target apparatus; and specific causal relationship information that is used in each specific type of failure diagnosis among the plurality of types of failure diagnosis; and a diagnosis execution unit configured to selectively execute the plural types of failure diagnosis by using a combined causal relationship information that is a combination of the common causal relationship information and a piece of the specific causal relationship information corresponding to a diagnosis-target type of failure diagnosis.

BRIEF DESCRIPTION OF THE DRAWINGS

An exemplary embodiment of the invention will be described in detail based on the following figures, wherein:

FIG. 15 illustrates an example of a model update action selection table;

FIG. 18 illustrates an example of a bug list.

DETAILED DESCRIPTION

Hereinafter, an exemplary embodiment of the invention will be described with reference to the drawings.

Figure 1:
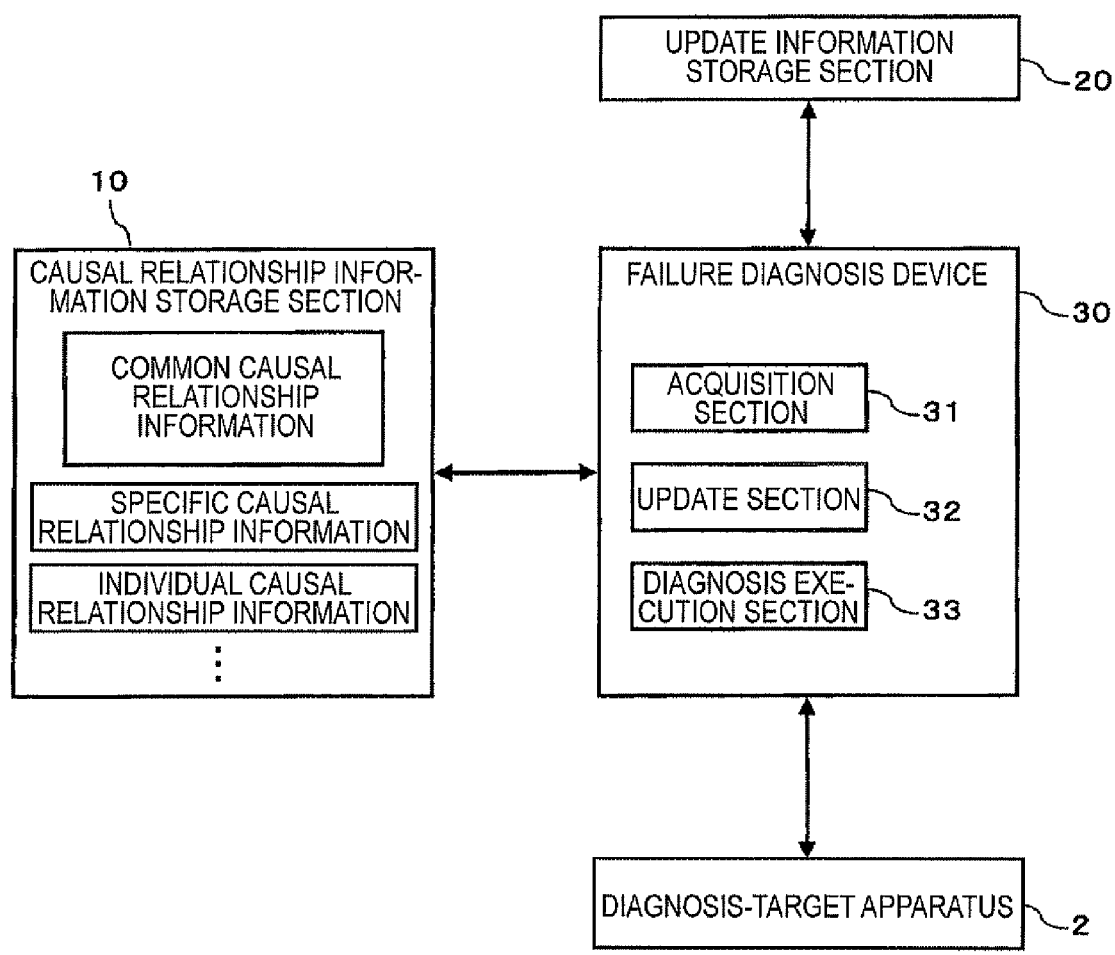
FIG. 1 illustrates an exemplary configuration of a failure diagnosis system according to an exemplary embodiment.

FIG. 1 illustrates an exemplary configuration of a failure diagnosis system 1 according to the exemplary embodiment. The failure diagnosis system 1 performs a failure diagnosis on a diagnosis-target apparatus 2. For example, the diagnosis-target apparatus 2 is a copy machine, a printer, a facsimile machine, or an image processing apparatus, such as a multi function apparatus or the like, having the functions of the copy machine, the printer, and the facsimile machine. The diagnosis-target apparatus 2 may be an apparatus other than the image processing apparatus.

Referring to FIG. 1, the failure diagnosis system 1 has a causal relationship information storage section 10, an update information storage section 20, and a failure diagnosis device 30.

The causal relationship information storage section 10 stores causal relationship information representing the causal relationship between events regarding the diagnosis-target apparatus 2.

In one aspect, the causal relationship information storage section 10 is realized by a storage device, such as a hard disk device or the like in the diagnosis-target apparatus 2, but it may be realized by other aspects.

The causal relationship information is information for failure diagnosis of the diagnosis-target apparatus 2, and is, for example, a diagnosis model which is obtained by modeling the causal relationship between failure phenomenon of the diagnosis-target apparatus 2 and the cause of the failure phenomenon. In one aspect, the causal relationship information is a causal network of failure phenomenon and the failure cause, for example, a Bayesian network. The Bayesian network is a probability model in which the qualitative dependency relationship between plural probability variables (nodes) is expressed by a graph structure, and the quantitative relationship between the probability variables is expressed by a conditional probability.

In the exemplary embodiment, the causal relationship information storage section 10 stores causal relationship information. The causal relationship information includes common causal relationship information that is common to plural types of failure diagnosis regarding the diagnosis-target apparatus 2 and specific causal relationship information that is specific to each type of failure diagnosis. In the exemplary embodiment, the causal relationship information includes the common causal relationship information and the specific causal relationship information, from the viewpoint of reducing the load for updating the causal relationship information, or the like.

The common causal relationship information is information commonly used in plural types of failure diagnosis regarding the diagnosis-target apparatus 2, and is functioning as the main (or basic) portion of a diagnosis model, such as the Bayesian network, or the like. The common causal relationship information is, for example, a model constructed based on the configuration of the diagnosis-target apparatus 2.

In one specific aspect, the common causal relationship information has a larger quantity as compared with the specific causal relationship information. The common causal relationship information is updated with lower frequency as compared with the specific causal relationship information, or not updated.

The specific causal relationship information is information that is used in a specific type of failure diagnosis among the plural types of failure diagnosis. The specific causal relationship information is combined with the common causal relationship information, thereby forming causal relationship information for specific type of failure diagnosis. The specific causal relationship information is part of a diagnosis model, such as the Bayesian network or the like. The specific causal relationship information is a model in which instances of failure or maintenance are reflected.

In one specific aspect, the specific causal relationship information has a smaller quantity as compared with the common causal relationship information. The specific causal relationship information is updated with higher frequency as compared with the common causal relationship information, and is, for example, a temporary model.

The update information storage section 20 stores update information for updating the specific causal relationship information stored in the causal relationship information storage section 10.

In one aspect, the update information storage section 20 is realized by a database on a network, but it may be realized by other aspects.

The update information storage section 20 stores update information for updating the specific causal relationship information of each type of failure diagnosis in association with the relevant type. In the update information storage section 20, the update information is classified in accordance with the types of failure diagnosis.

The update information is, for example, information that is used to reflect an instance of failure or maintenance in the specific causal relationship information, generated based on an instance of failure or maintenance, and stored in the update information storage section 20. In one illustrative use, from the viewpoint of the rapid reflection of an instance of failure on the market in a diagnosis model, or the like, if failure occurs, update information regarding this failure is rapidly generated and registered in the update information storage section 20.

The update information storage section 20 may store update information for updating the common causal relationship information, in addition to the update information for updating the specific causal relationship information.

The failure diagnosis device 30 performs the failure diagnosis of the diagnosis-target apparatus 2 based on the causal relationship information stored in the causal relationship information storage section 10. The failure diagnosis device 30 also has a function to update the causal relationship information of the causal relationship information storage section 10 based on the update information stored in the update information storage section 20.

In one aspect, the failure diagnosis device 30 is realized by the cooperation of hardware resources and software, and is, for example, a computer. A program recorded on a recording medium, such as a ROM (Read Only Memory) or the like, is read out to a main storage device (main memory) and a CPU (Central Processing Unit) executes the program, thereby realizing the respective functions of the failure diagnosis device 30. The program may be provided through a computer-readable recording medium, such as a CD-ROM or the like, or may be provided through communication as data signals. The failure diagnosis device 30 may be realized by hardware alone. Further, the failure diagnosis device 30 may be realized by a single device physically, or may be realized by a plurality of devices.

The failure diagnosis device 30 has an acquisition section 31, an update section 32, and a diagnosis execution section 33.

The acquisition section 31 acquires information representing the events regarding the diagnosis-target apparatus 2. The acquisition section 31 acquires evidence information observed by the diagnosis-target apparatus 2 or the user, for example, information representing the failure phenomenon occurring in the diagnosis-target apparatus 2, information representing a replaced constituent element (parts or unit) in the diagnosis-target apparatus 2, information detected by various sensors of the diagnosis-target apparatus 2, information representing the operation history (for example, the number of sheets on which image has been formed) of the diagnosis-target apparatus 2, or the like. The acquisition section 31 acquires the above-described information from the diagnosis-target apparatus 2 or the user.

The update section 32 selectively updates the specific causal relationship information stored in the causal relationship information storage section 10 by using the update information stored in the update information storage section 20. For example, the update section 32 selects a type to be updated from among plural types based on information acquired by the acquisition section 31 or the user's instruction, acquires update information corresponding to the selected type from the update information storage section 20, and updates the specific causal relationship information of the selected type by using the acquired update information.

In one aspect, the update section 32 selectively acquires update information specific to an event, which is represented by the information acquired by the acquisition section 31, from the update information storage section 20, and updates specific causal relationship information of a type specific to the event by using the update information.

The update is performed by the update section 32, for example, when failure phenomenon occurs in the diagnosis-target apparatus 2, when a constituent element in the diagnosis-target apparatus 2 is replaced, when an instruction is made by the user, at a regular interval, or the like.

The diagnosis execution section 33 selectively executes plural types of failure diagnosis regarding the diagnosis-target apparatus 2. The diagnosis execution section 33 executes failure diagnosis of a diagnosis-target type by using causal relationship information which is a combination of the common causal relationship information and specific causal relationship information corresponding to the diagnosis-target type from among plural types of specific causal relationship information.

For example, the diagnosis execution section 33 selects a type to be subject to failure diagnosis from among plural types based on information acquired by the acquisition section 31 or a user's instruction, and acquires common causal relationship information and specific causal relationship information of the selected type from the causal relationship information storage section 10. The common causal relationship information and the specific causal relationship information are combined to generate causal relationship information, so failure diagnosis of the selected type is executed based on evidence information acquired by the acquisition section 31 by using the causal relationship information. For example, the diagnosis execution section 33 combines the common causal relationship information and the specific causal relationship information to generate a Bayesian network including failure cause nodes and evidence nodes, and inputs the evidence information to the Bayesian network to estimate the probability of each failure cause node. In this case, for example, each failure cause node corresponds to each constituent element of the diagnosis-target apparatus 2, and the probability of each failure cause node represents the failure occurrence probability of each constituent element.

The diagnosis execution section 33 outputs the result of the failure diagnosis to a display device, a storage device, or the like (not illustrated). For example, the diagnosis execution section 33 outputs the estimated probability of each failure cause node, information representing a failure cause node having the highest probability, or the like.

The diagnosis is performed by the diagnosis execution section 33, for example, when failure phenomenon occurs in the diagnosis-target apparatus 2, when a constituent element in the diagnosis-target apparatus 2 is replaced, when a new instruction is made again by the user, at a regular interval, or the like.

In one aspect, when executing a failure diagnosis, the failure diagnosis device 30 is configured such that the update section 32 updates the specific causal relationship information of the diagnosis-target type, and the diagnosis execution section 33 combines the updated specific causal relationship information and the common causal relationship information to form causal relationship information, so that the failure diagnosis device 30 executes failure diagnosis of the diagnosis-target type by using the causal relationship information.

In one specific aspect, when the acquisition section 31 acquires information representing a failure phenomenon occurring in the diagnosis-target apparatus 2, the update section 32 updates specific causal relationship information of a type specific to the failure phenomenon. The diagnosis execution section 33 executes a failure diagnosis of the type specific to the failure phenomenon by using causal relationship information which is a combination of the common causal relationship information and the updated specific causal relationship information. For example, the cause of the failure phenomenon is inferred.

Figure 2:
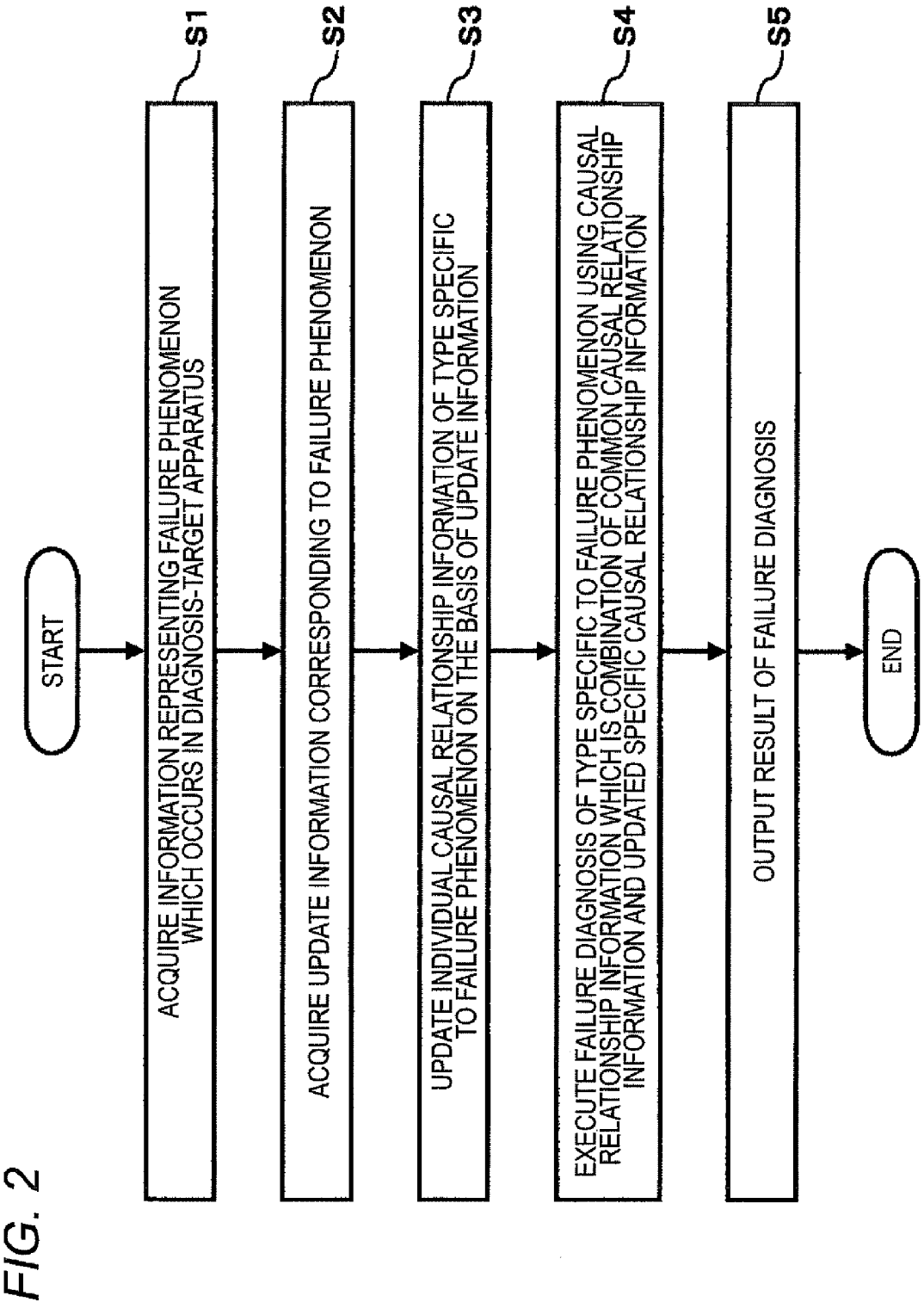
FIG. 2 is an exemplary flowchart illustrating an operation of a failure diagnosis device.

FIG. 2 is a flowchart illustrating an exemplary operation of the failure diagnosis device 30. Hereinafter, an exemplary operation of the failure diagnosis device 30 will be described with reference to FIG. 2.

If the information of failure phenomenon having occurred in the diagnosis-target apparatus 2 is acquired from the diagnosis-target apparatus 2 (S1), the failure diagnosis device 30 acquires update information corresponding to the failure phenomenon from the update information storage section 20 (S2).

Next, the failure diagnosis device 30 updates specific causal relationship information of a type specific to the failure phenomenon from among plural types of specific causal relationship information stored in the causal relationship information storage section 10 by using the acquired update information (S3).

Next, the failure diagnosis device 30 executes failure diagnosis of a type specific to failure phenomenon by using causal relationship information which is a combination of the common causal relationship information and the updated specific causal relationship information (S4). For example, the failure diagnosis device 30 infers the cause of the failure phenomenon by using the Bayesian network.

Next, the failure diagnosis device 30 outputs the result of failure diagnosis (S5).

Hereinafter, an example of the failure diagnosis system according to the exemplary embodiment will be described.

Figure 3:
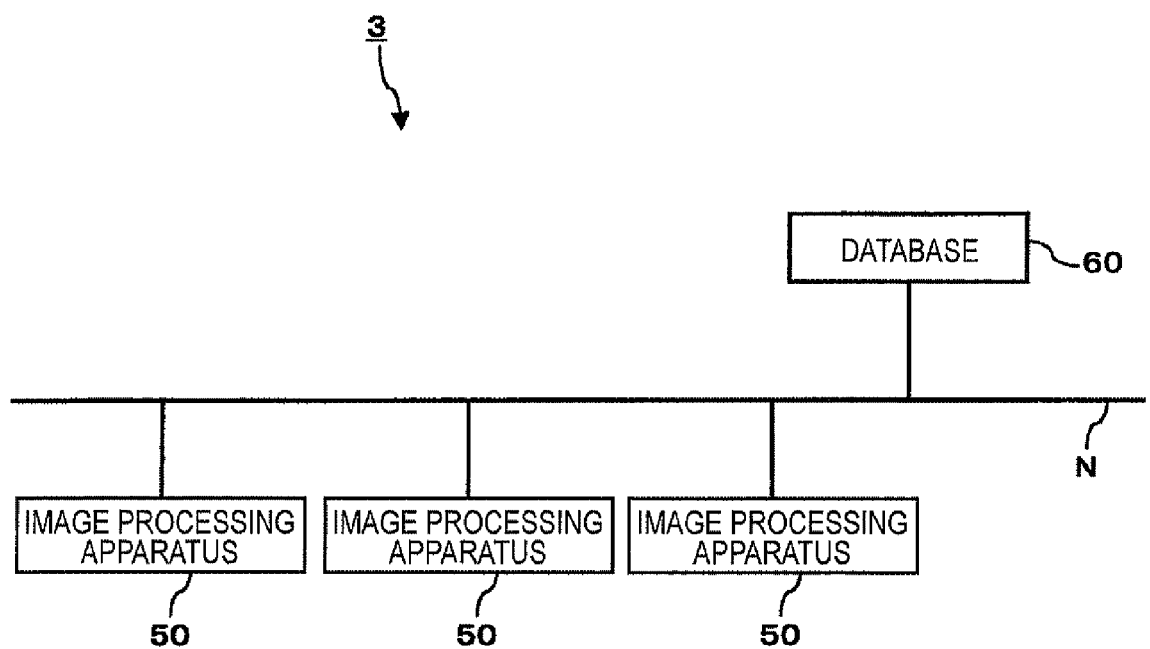
FIG. 3 illustrates an exemplary configuration of an image processing system including a failure diagnosis system according to an exemplary embodiment.

FIG. 3 illustrates an exemplary configuration of an image processing system 3 including the failure diagnosis system according to the exemplary embodiment.

The image processing system 3 includes one or more image processing apparatuses 50, and the respective image processing apparatuses 50 are connected to a network N, such as Internet, a LAN, or the like. In addition to the image processing apparatus 50, a database 60 for storing update information is connected to the network N. In this example, the image processing apparatus 50 is a so-called multi function apparatus having the functions of a scanner, a printer, a facsimile machine, and a copy machine.

Figure 4:
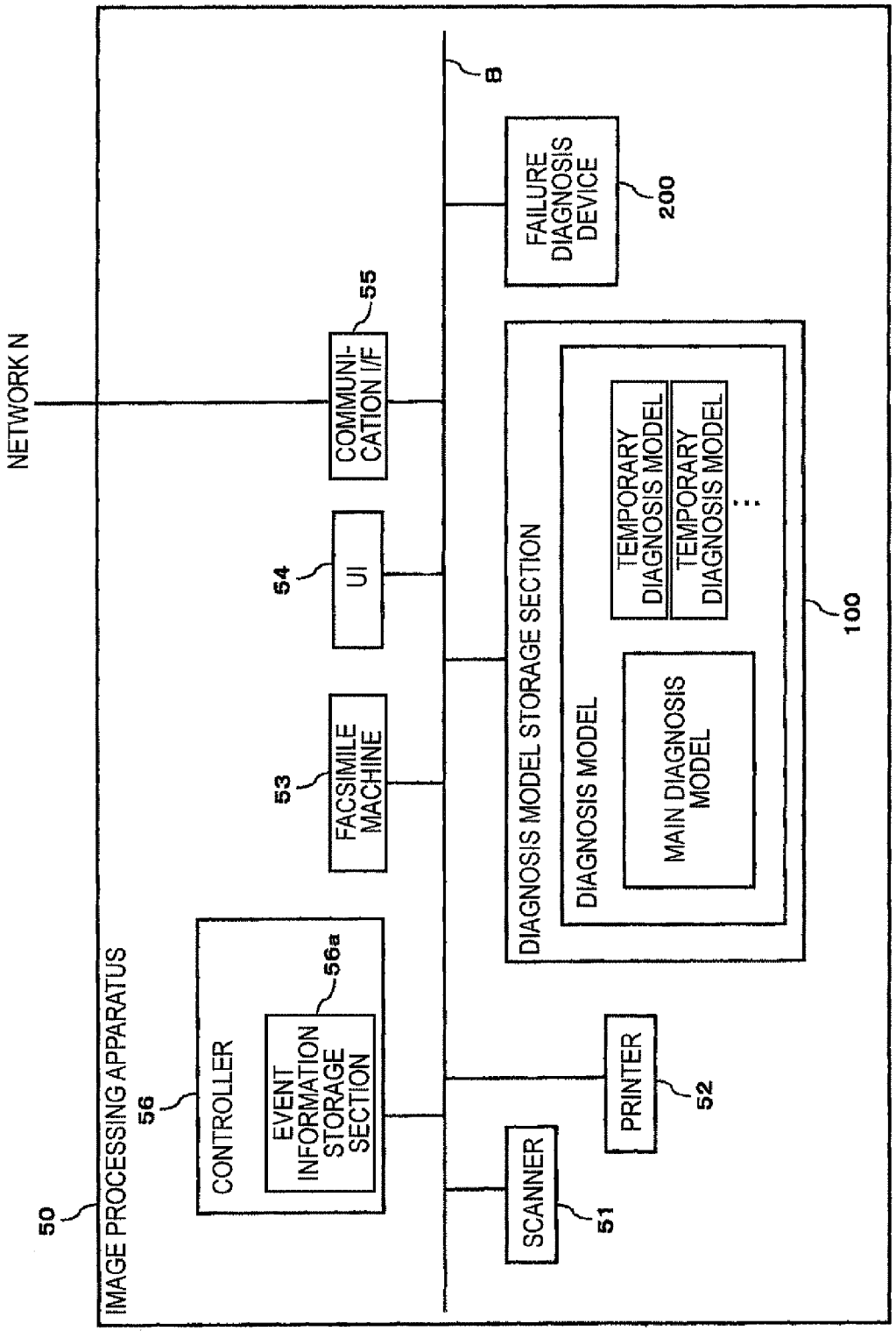
FIG. 4 illustrates an exemplary configuration of an image processing apparatus.

FIG. 4 illustrates an exemplary configuration of the image processing apparatus 50. Referring to FIG. 4, the image processing apparatus 50 has an image reading device (scanner) 51, an image forming device (printer) 52, a facsimile machine 53, a user interface (UI) 54, a communication interface 55, a controller 56, a diagnosis model storage section 100, and a failure diagnosis device 200. These constituent elements are all connected to a bus B.

The scanner 51 optically reads the original document image and generates image data.

The printer 52 prints image data generated by the scanner 51 or sent from a client on the network N on a printing medium, such as paper or the like.

The facsimile machine 53 facsimile-transmits image data generated by the scanner 51, or the like, and receives image data from an external facsimile machine.

The UI 54 displays information for the user or receives an operation from the user, and is, for example, a touch panel-type liquid crystal display.

The communication interface 55 communicates with devices, such as the database 60 and the like on the network N.

The controller 56 controls the entire image processing apparatus 50. The controller 56 includes a CPU, a main memory, a ROM, an NVRAM (Nonvolatile RAM), and the like. A program recorded on a recording medium, such as the ROM or the like, is read out to the main memory, and the CPU executes the program, thereby realizing the functions of the controller 56.

The controller 56 includes an event information storage section 56a including a status register or the like. If a specific event occurs in the image processing apparatus 50, information regarding the relevant event is recorded in the event information storage section 56a.

When a software error due to a bug or the like, or a hardware error due to part failure occurs, the controller 56 sets a flag indicating the occurrence of an error and records an error code for identifying the occurred error. When parts replacement is carried out, for example, the part number of the replacement part is given to the controller 56 through the UI 54 by the replacement worker, and the controller 56 sets a flag indicating parts replacement and records the part number of the replacement part. When firmware update is carried out, the controller 56 sets a flag indicating firmware update, and a version number indicating the version of firmware is recorded. When a failure diagnosis execution request from the user is received, the controller 56 sets a flag indicating the failure diagnosis execution request.

The diagnosis model storage section 100 stores a diagnosis model which is obtained by modeling the cause of the failure of the image processing apparatus 50 as causal relationship information for failure diagnosis of the image processing apparatus 50, and is realized by, for example, a hard disk device or the like.

The diagnosis model includes a main diagnosis model as the common causal relationship information and a plurality of temporary diagnosis models as the specific causal relationship information.

Figure 5:
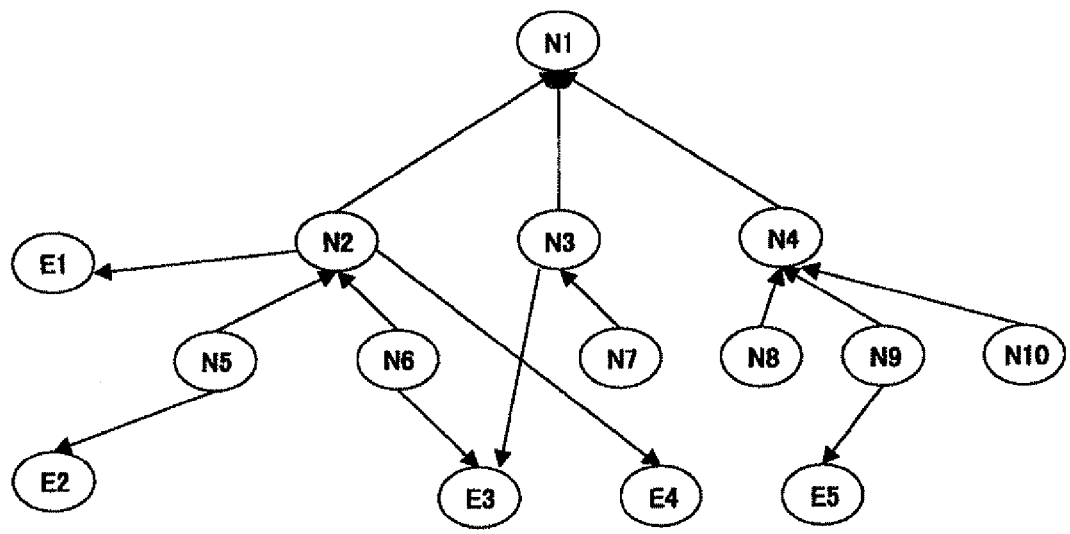
FIG. 5 illustrates an example of a main diagnosis model.

The main diagnosis model is constructed in accordance with the model or the option configuration of the relevant image processing apparatus 50, and has the structure in which all portions are almost entirely fixed. The main diagnosis model is a causal network of failure points and failure phenomenon, and is, for example, a Bayesian network having the structure such as illustrated in FIG. 5. Referring to FIG. 5, the Bayesian network has nodes N1 through N10 representing failure points and nodes E1 through E5 representing failure phenomenon. In the Bayesian network, the qualitative dependency relationship between the nodes is expressed by an arrow connecting the nodes. The source of the arrow is a cause node, and the destination of the arrow is an effect node. All nodes are respectively provided with a conditional probability table. Detailed descriptions of the Bayesian network will be omitted.

Figure 6:
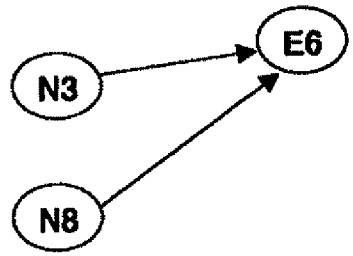
FIG. 6 illustrates an example of a partial diagnosis model.
Figure 7:
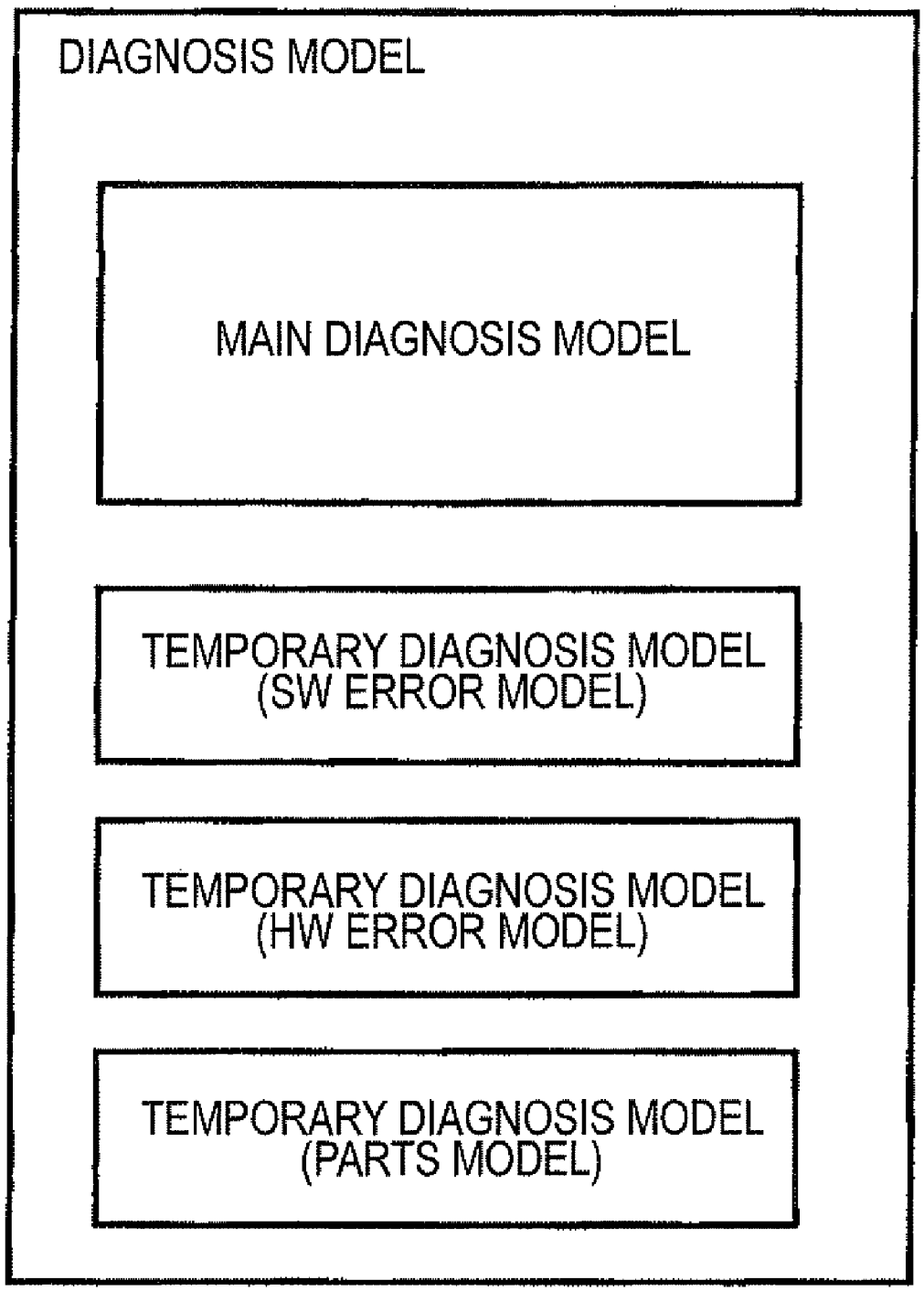
FIG. 7 illustrates an example of a diagnosis model.

The temporary diagnosis model temporarily reflects failure or maintenance, and includes, for example, a partial diagnosis model such as illustrated in FIG. 6. Referring to FIG. 6, the partial diagnosis model is a Bayesian network, and has nodes N3 and N8 representing failure points and a node E6 representing failure phenomenon. The partial diagnosis model is used in combination with the main diagnosis model such as illustrated in FIG. 5. In this example, as illustrated in FIG. 7, a plurality of temporary diagnosis models includes an SW error model regarding a software error, an HW error model regarding a hardware error, and a parts model regarding parts replacement. The SW error model, the HW error model, and the like may be classified in accordance with the types of errors, and many other types of temporary diagnosis models may be further provided.

For example, information regarding the bug is included in a diagnosis model when a bug occurs in firmware of a certain version, and the information regarding the bug is excluded from the diagnosis model when the bug is fixed with the next version. For example, such model that is frequently combined into or excluded from a diagnosis model is incorporated into a temporary diagnosis model.

The failure diagnosis device 200 performs failure diagnosis of the image processing apparatus 50 by using diagnosis models stored in the diagnosis model storage section 100. The failure diagnosis device 200 includes a CPU, a main memory, a ROM, an NVRAM, and the like. A program recorded on a recording medium, such as the ROM or the like is read out to the main memory, and the CPU executes the program, thereby realizing the functions of the failure diagnosis device 200.

Figure 8:
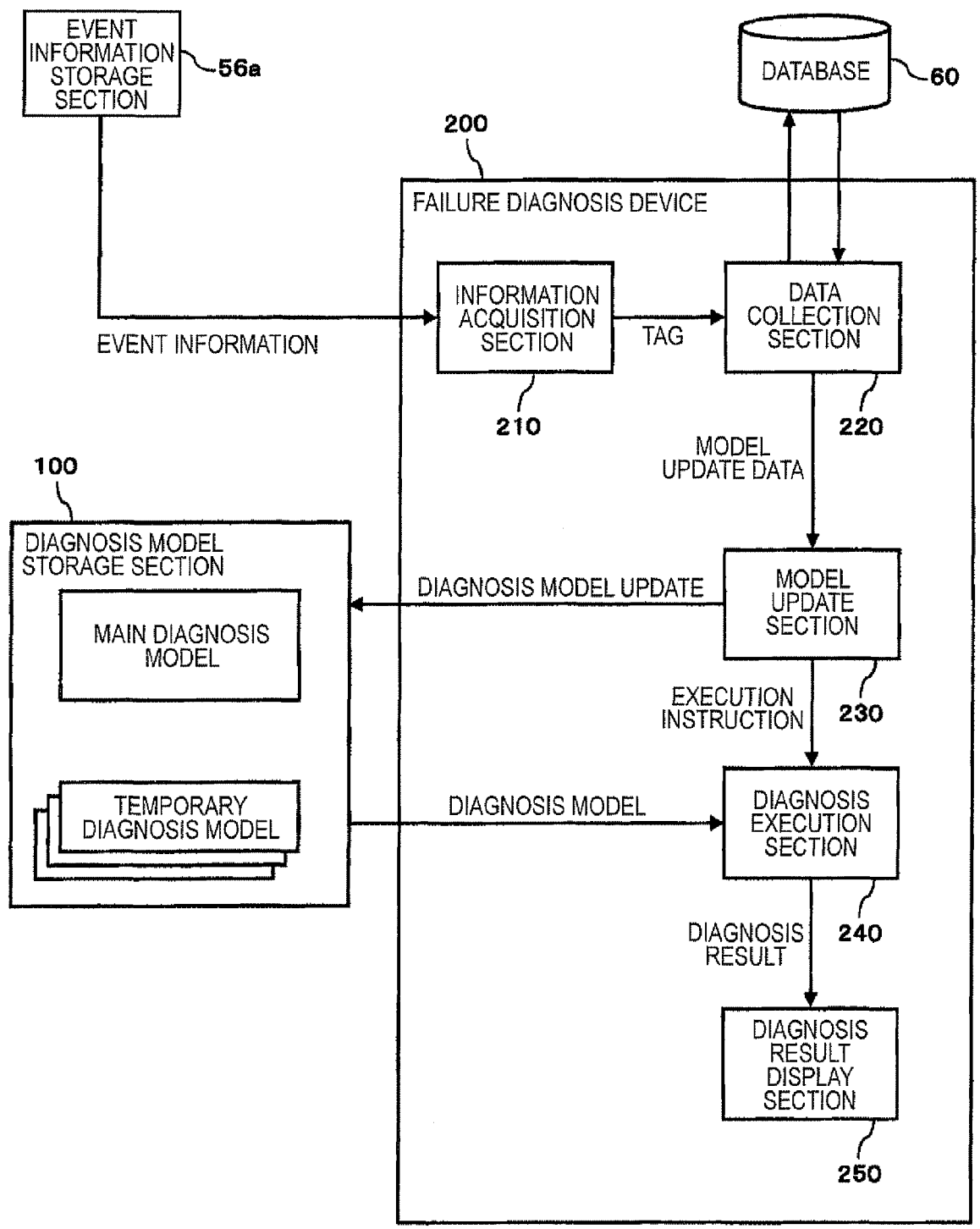
FIG. 8 illustrates an exemplary configuration of a failure diagnosis device.

FIG. 8 illustrates an exemplary configuration of the failure diagnosis device 200. Referring to FIG. 8, the failure diagnosis device 200 has an information acquisition section 210, a data collection section 220, a model update section 230, a diagnosis execution section 240, and a diagnosis result display section 250.

The information acquisition section 210 acquires information, which is stored in the event information storage section 56*a*, regarding an event occurring in the image processing apparatus 50.

Figures 9, 10:
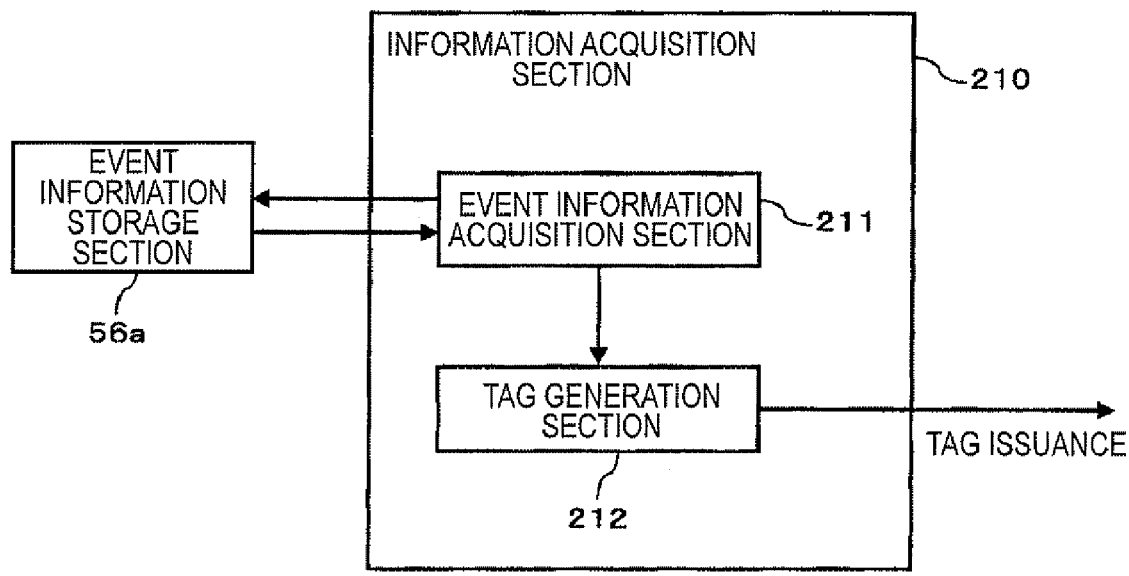
FIG. 9 illustrates an exemplary configuration of an event information acquisition section.
FIG. 10 illustrates an example of a tag generated by a tag generation section.

As illustrated in FIG. 9, the information acquisition section 210 has an event information acquisition section 211 that scans the status register in the event information storage section 56*a* to acquire an activated flag and information regarding thereto, and a tag generation section 212 that analyzes the acquired flag and information to generate a tag.

For example, when a software error or a hardware error occurs in the image processing apparatus 50, the event information acquisition section 211 acquires a flag indicating the occurrence of an error and the error code of the occurred error from the event information storage section 56*a*. The tag generation section 212 determines whether the type of event that occurred is a software error or a hardware error based on the flag and the error code with reference to a previously-provided table, and generates a tag including information representing the type of the event and the error code based on the determination result. For example, in the case of a software error of an error code "123-456", as illustrated in FIG. 10, a symbol "SW. E" representing a software error and the error code are tagged, and a tag <SW. E. 123-456> is generated. In the case of a hardware error of an error code "234-567", as illustrated in FIG. 10, a symbol "HW. E" representing a hardware error and the error code are tagged, and a tag <HW. E. 234-567> is generated.

When firmware of the image processing apparatus 50 is updated, the event information acquisition section 211 acquires a flag representing firmware update and the version number of firmware after update from the event information storage section 56*a*. The tag generation section 212 determines from the flag whether or not the type of the event is firmware update, and as illustrated in FIG. 10, generates a tag <UPD. V1. 225> based on a symbol "UPD" representing firmware update and a version number "V1. 225".

When parts replacement is carried out in the image processing apparatus 50, the event information acquisition section 211 acquires a flag representing parts replacement and the part number corresponding to the replaced part from the event information storage section 56*a*. The tag generation section 212 determines from the flag whether or not the type of the event is parts replacement, and as illustrated in FIG. 10, generates a tag <PEX. No56789> based on a symbol "PEX" representing parts replacement and a part number "No56789".

When a diagnosis request purporting that failure diagnosis should be executed without updating a diagnosis model is given to the image processing apparatus 50, for example, when the user selects and instructs "diagnosis execution with no model update" from the UI 54, as illustrated in FIG. 10, the tag generation section 212 generates a tag <NA> indicating a diagnosis execution request with no model update.

The tag thus generated is issued toward the data collection section 220.

The data collection section 220 selectively collects update information specific to an event, which is represented by information acquired by the information acquisition section 210, from the database 60.

Figure 11:
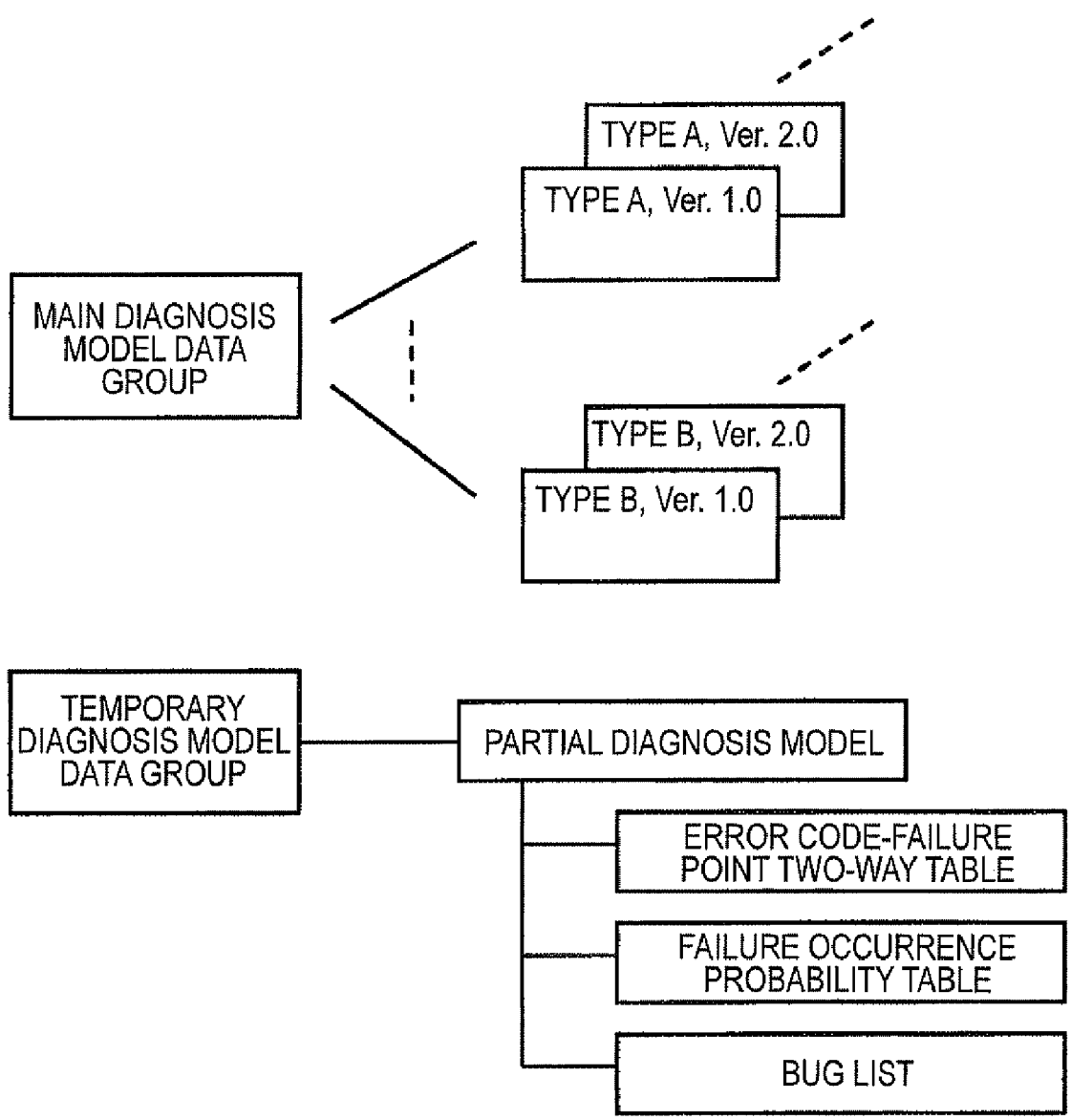
FIG. 11 illustrates an exemplary data configuration in a database.

As illustrated in FIG. 11, the database 60 includes a main diagnosis model data group which is information for updating the main diagnosis model and a temporary diagnosis model data group which is information for updating the temporary diagnosis models. The main diagnosis model data group includes, for example, a main diagnosis model for each model and each firmware version. The temporary diagnosis model data group includes, for example, one or more partial diagnosis models (see FIG. 6). The database 60 stores, for example, a two-way table of error codes and failure points, a failure occurrence probability table, a bug list, and the like as information forming partial diagnosis models.

Figures 16, 17:
FIG. 16 illustrates an exemplary updating condition of a conditional probability table.
FIG. 17 illustrates an example of a two-way table of error codes and failure points.

As illustrated in FIG. 17, the two-way table of error codes and failure points represents the causal relationship between the error codes and the failure points. In FIG. 17, each circle indicates that an error code in a row corresponding to the circle occurs due to a failure point in a column corresponding to the circle. The failure point corresponds to, for example, a replacement part.

The failure occurrence probability table stores the part number and the conditional probability table of a part in an associated manner. The failure occurrence probability table is generated based on market data, for example.

As illustrated in FIG. 18, the bug list represents the relationship between, the number of a bug, an error code due to the bug, the version of firmware where the bug has occurred, the number of a software component associated with the bug, and the part number of a part associated with the bug.

Figure 12:
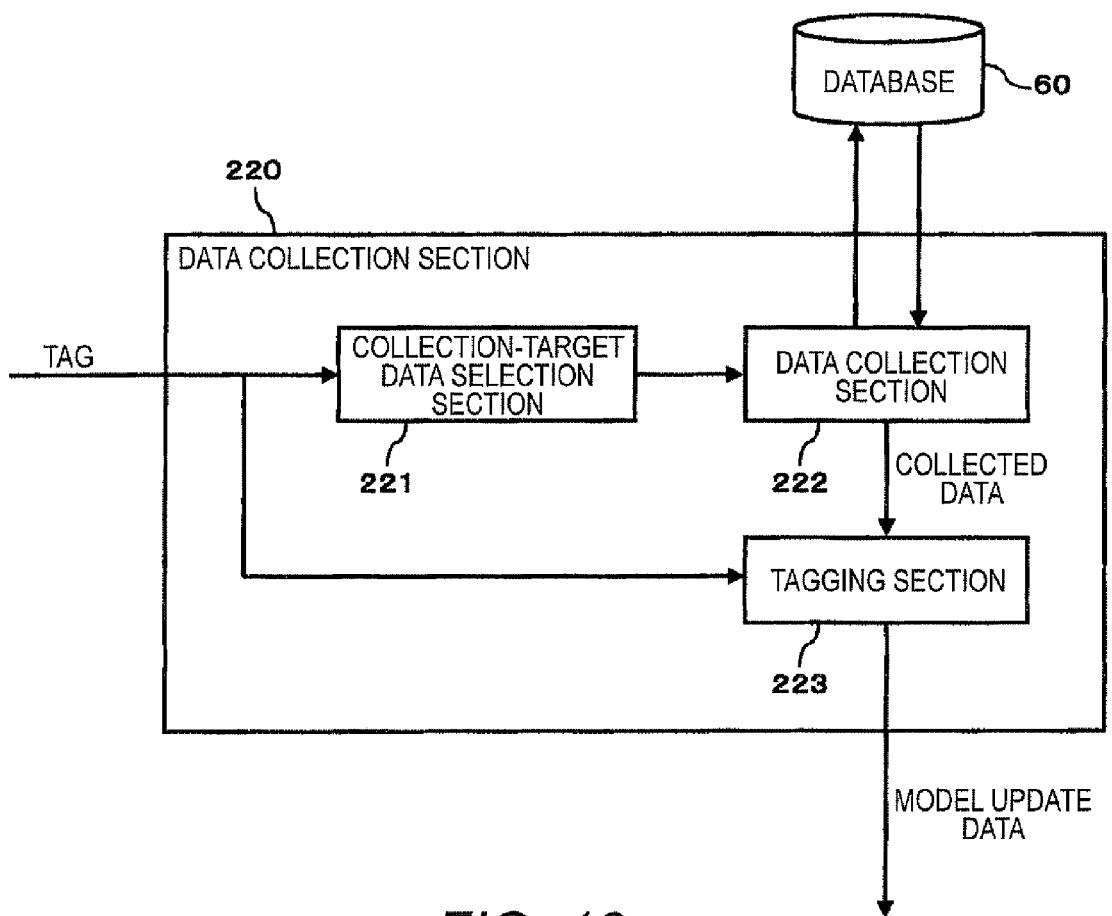
FIG. 12 illustrates an exemplary configuration of a data collection section.

As illustrated in FIG. 12, the data collection section 220 has a collection-target data selection section 221, a data collection section 222, and a tagging section 223.

The collection-target data selection section 221 receives a tag issued by the information acquisition section 210, and selects data to be collected from the database 60 based on the tag.

For example, when the tag is <SW. E. 123-456>, the collection-target data selection section 221 selects collection of a partial diagnosis model corresponding to the error code "123-456".

When the tag is <HW. E. 234-567>, the collection-target data selection section 221 selects collection of a partial diagnosis model corresponding to the error code "234-567".

When the tag is <UPD. V1. 225>, the collection-target data selection section 221 selects collection of a main diagnosis model corresponding to the version number "V1. 225".

When the tag is <PEX. No56789>, the collection-target data selection section 221 selects collection of a partial diagnosis model (for example, a conditional probability table of a replacement part) corresponding to the version number "No56789".

When the tag is <NA>, the collection-target data selection section 221 selects no collection of data.

The data collection section 222 collects data from the database 60 based on the selection result of the collection-target data selection section 221.

Figure 13:
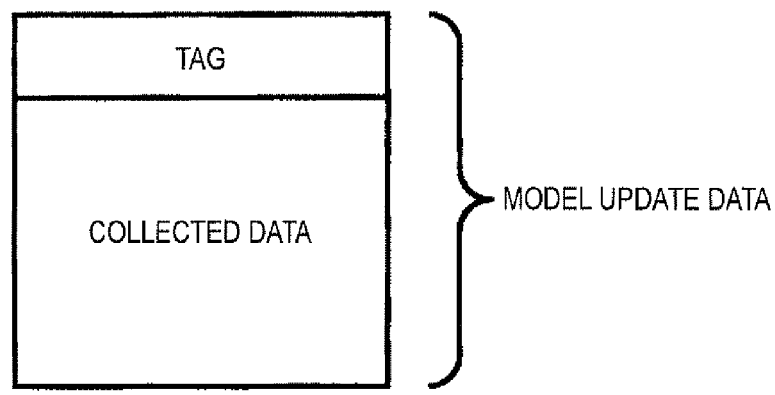
FIG. 13 illustrates an exemplary configuration of model update data.

The tagging section 223 merges the tag and collected data collected by the data collection section 222 to generate model update data, and delivers model update data to the model update section 230. For example, as illustrated in FIG. 13, model update data is structured such that a tag as a header is appended to collected data.

The model update section 230 selectively updates a temporary diagnosis model corresponding to an event, which is represented by information acquired by the information acquisition section 210, by using data collected by the data collection section 220 from the database 60.

Figure 14:
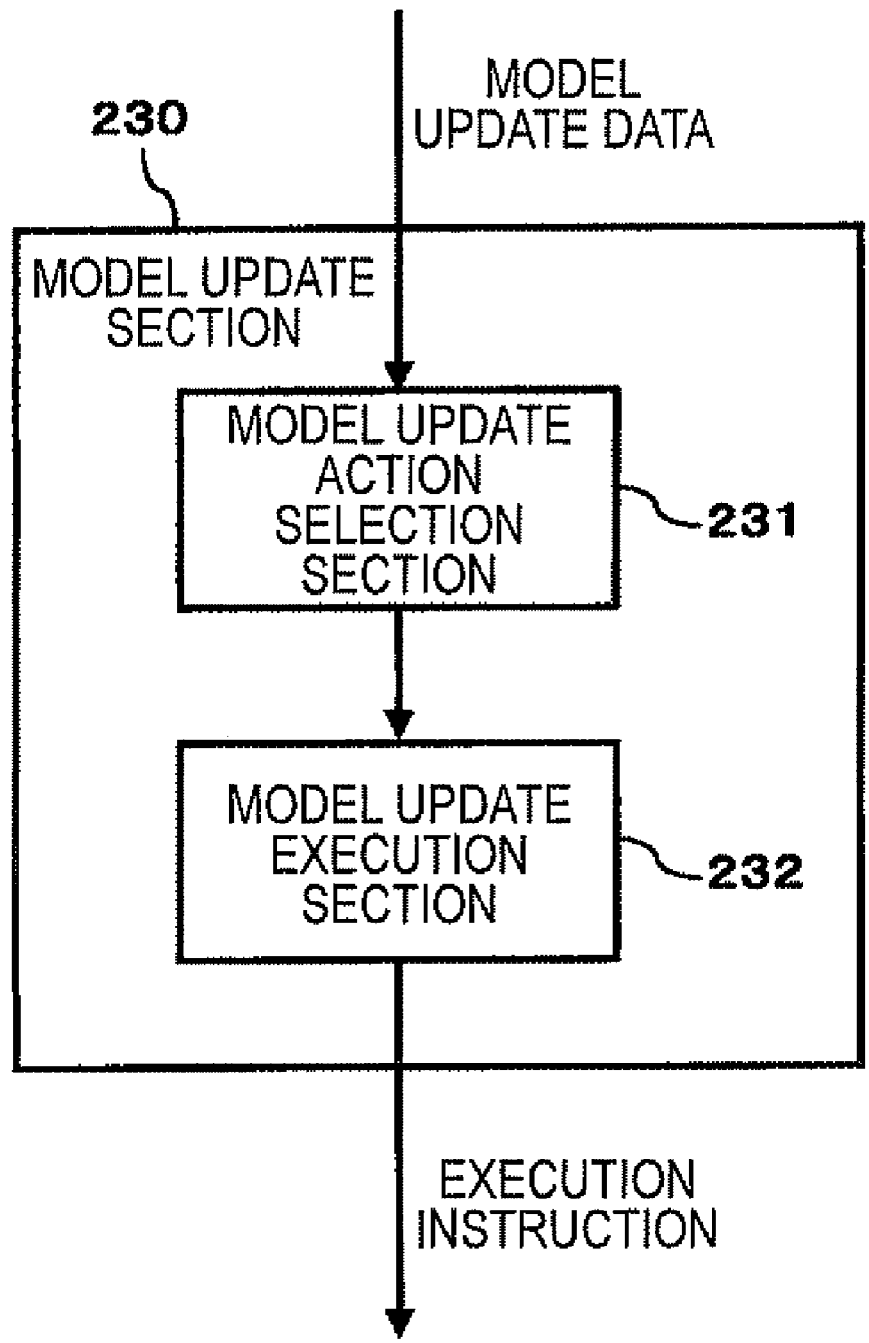
FIG. 14 illustrates an exemplary configuration of a model update section.

As illustrated in FIG. 14, the model update section 230 has a model update action selection section 231 and a model update execution section 232.

The model update action selection section 231 receives model update data from the data collection section 220, and selects a diagnosis model to be updated and an update action to be executed based on the tag included in the model update data. For example, the model update action selection section 231 selects an update-target diagnosis model and an update action with reference to a model update action selection table such as illustrated in FIG. 15. In the model update action selection table of FIG. 15, tags, update-target diagnosis models, and update actions to be executed are associated with each other.

For example, when the tag is <SW. E. xxx>, an action is selected as follows: "Add a collected partial diagnosis model to an SW error model. When overlapping, update with latest data." "xxx" means an arbitrary number, and the same is applied to the following cases.

When the tag is <HW. E. xxx>, an action "Add a collected partial diagnosis model to an HW error model. When overlapping, update with latest data." is selected.

When the tag is <UPD. Vxxx>, an action is selected as follows: "Overwrite the main diagnosis model with the collected main diagnosis model, and delete duplicated data of the main diagnosis model from a temporary diagnosis model."

When the tag is <PEX. xxx>, an action is selected as follows: "Add a collected partial diagnosis model (for example, a conditional probability table of a replacement part) to a parts model. When there is a node corresponding to the replacement part in the main diagnosis model, update data of conditional probability table of the node of the main diagnosis model with collected data." FIG. 16 illustrates the updating of a conditional probability table.

When the tag is <NA>, "Do not carry out update of a diagnosis model" is selected.

The model update execution section 232 executes update of a diagnosis model stored in the diagnosis model storage section 100 in accordance with the selection result of the model update action selection section 231. If update is completed, the model update execution section 232 gives an execution instruction of failure diagnosis to the diagnosis execution section 240 based on the tag. The execution instruction includes, for example, designation of a temporary diagnosis model for use in failure diagnosis, and a tag.

The diagnosis execution section 240 acquires a main diagnosis model and a temporary diagnosis model specific to an event which is represented by information acquired by the information acquisition section 210 from the diagnosis model storage section 100, combines the main diagnosis model and the temporary diagnosis model to construct a diagnosis model, and executes failure diagnosis by using the diagnosis model.

When receiving an execution instruction for failure diagnosis from the model update section 230, the diagnosis execution section 240 merges the main diagnosis model and the designated temporary diagnosis model based on the execution instruction to construct a Bayesian network, and executes failure diagnosis by using the Bayesian network.

For example, when the tag is <SW. E. 123-456>, the diagnosis execution section 240 merges a main diagnosis model and an SW error model to construct a Bayesian network, defines a failure phenomenon node corresponding to the error code "123-456" in the Bayesian network, propagates the probability with the failure phenomenon node as a start point, and estimates the probability of each failure point node.

When the tag is <UPD. Vxxx>, the diagnosis execution section 240 merges all temporary diagnosis models into a main diagnosis model to construct a Bayesian network, propagates the probability without inputting probability data regarding a failure phenomenon node in the Bayesian network, and estimates the probability of each failure point node. In this case, the relevant event is not a failure event, so diagnosis execution may be omitted.

When the tag is <PEX.Noxxx>, the diagnosis execution section 240 merges a main diagnosis model and a parts model to construct a Bayesian network, propagates the probability with no input of probability data of a failure phenomenon node in the Bayesian network, and estimates the probability of each failure point node. Also in this case, the relevant event is not a failure event, so diagnosis execution may be omitted.

When the tag is <NA>, the diagnosis execution section 240 merges a main diagnosis model and all temporary diagnosis models to construct a Bayesian network, propagates the probability while inputting the state "no phenomenon" to each failure phenomenon node as defined data in the Bayesian network, and estimates the probability of each failure point node.

The diagnosis result display section 250 displays the result of the failure diagnosis of the diagnosis execution section 240 on a display device (for example, the UI 54). For example, the diagnosis result display section 250 displays failure points in descending order of probability, or displays upper-level N (where N is an integer of 1 or more) failure points having a high probability.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment is described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A failure diagnosis system comprising:
a causal relationship information storage unit configured to store causal relationship information representing a causal relationship between events regarding a diagnosis-target apparatus, the causal relationship information including:
common causal relationship information that is commonly used in a plurality of types of failure diagnosis regarding the diagnosis-target apparatus; and
specific causal relationship information that is used in each specific type of failure diagnosis among the plurality of types of failure diagnosis;
a diagnosis execution unit configured to selectively execute the plural types of failure diagnosis by using a combined causal relationship information that is a combination of the common causal relationship information and a piece of the specific causal relationship information corresponding to a diagnosis-target type of failure diagnosis;
an update information storage unit configured to store update information for updating the specific causal relationship information; and
an update unit configured to selectively update the specific causal relationship information by using the update information.

2. The failure diagnosis system according to claim 1, further comprising:
an acquisition unit configured to acquire information representing an event regarding the diagnosis-target apparatus,
wherein, when the acquisition unit acquires information representing a failure phenomenon occurring in the diagnosis-target apparatus, the update unit updates a piece of the specific causal relationship information corresponding to the failure phenomenon, and the diagnosis execution unit executes the failure diagnosis specific to the failure phenomenon by using an updated combined causal relationship information that is a combination of the common causal relationship information and the updated piece of the specific causal relationship information.

3. A failure diagnosis device comprising:
a processor and a memory, the processor configured to execute instructions stored in the memory to cause the processor to act as:
a diagnosis execution unit configured to selectively execute a plurality of types of failure diagnosis based on causal relationship information representing a causal relationship between events regarding a diagnosis-target apparatus, the causal relationship information including:
common causal relationship information that is commonly used in the plurality of types of failure diagnosis regarding the diagnosis-target apparatus; and
specific causal relationship information that is used in each specific type of failure diagnosis among the plurality of types of failure diagnosis,
wherein the diagnosis execution unit executes a diagnosis-target type of failure diagnosis by using a combined causal relationship information that is a combination of the common causal relationship information and a piece of specific causal relationship information corresponding to the diagnosis-target type of failure diagnosis.

4. An information update device comprising:
a processor and a memory, the processor configured to execute instructions stored in the memory to cause the processor to act as:
an update unit configured to selectively update causal relationship information representing a causal relationship between events regarding a diagnosis-target apparatus, the causal relationship information including:
common causal relationship information that is commonly used in a plurality of types of failure diagnosis regarding the diagnosis-target apparatus; and
specific causal relationship information that is used in each specific type of failure diagnosis among the plurality of types of failure diagnosis,
wherein the update unit selectively updates a piece of the specific causal relationship information by using update information for updating the specific causal relationship information.

5. A non-transitory computer-readable medium storing a program for enabling a computer to perform a process, the process comprising:
selectively executing a plurality of types of failure diagnosis based on causal relationship information representing a causal relationship between events regarding a diagnosis-target apparatus, the causal relationship information including:
common causal relationship information that is commonly used in the plurality of types of failure diagnosis regarding the diagnosis-target apparatus; and
specific causal relationship information that is used in each specific type of failure diagnosis among the plurality of types of failure diagnosis,
wherein a diagnosis-target type of failure diagnosis is executed by using a combined causal relationship information that is a combination of the common causal relationship information and a piece of specific causal relationship information corresponding to the diagnosis-target type of failure diagnosis.

6. A non-transitory computer-readable medium storing a program for enabling a computer to perform a process, the process comprising:
selectively updating causal relationship information representing a causal relationship between events regarding a diagnosis-target apparatus, the causal relationship information including:
common causal relationship information that is commonly used in a plurality of types of failure diagnosis regarding the diagnosis-target apparatus; and
specific causal relationship information that is used in each specific type of failure diagnosis among the plurality of types of failure diagnosis, wherein a piece of the specific causal relationship information is updated by using update information for updating the specific causal relationship information.

* * * * *